US006799218B1

(12) United States Patent
McGovern et al.

(10) Patent No.: US 6,799,218 B1
(45) Date of Patent: Sep. 28, 2004

(54) DEVICE AND METHOD FOR MANAGING COMMUNICATIONS BETWEEN DATA COMMUNICATIONS SYSTEMS

(75) Inventors: Thomas P. McGovern, LaGrange Park, IL (US); Michael Joseph Crowley, Oak Park, IL (US); James E. Eastwood, Bellingham, WA (US); Mario F. DeRango, Wauconda, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/545,642

(22) Filed: Apr. 7, 2000

(51) Int. Cl.[7] .............................................. G06F 15/16
(52) U.S. Cl. ....................................................... 709/232
(58) Field of Search ................................ 709/235, 230, 709/237, 200, 232

(56) References Cited

U.S. PATENT DOCUMENTS

| 5,408,609 | A | * | 4/1995 | Malgogne et al. | 709/228 |
| 5,519,699 | A | * | 5/1996 | Ohsawa | 370/231 |
| 5,560,021 | A | * | 9/1996 | Vook et al. | 713/323 |
| 5,572,678 | A | * | 11/1996 | Homma et al. | 709/227 |
| 5,617,541 | A | * | 4/1997 | Albanese et al. | 709/207 |
| 5,903,724 | A | * | 5/1999 | Takamoto et al. | 709/200 |
| 6,003,064 | A | * | 12/1999 | Wicki et al. | 709/200 |
| 6,035,335 | A | * | 3/2000 | Franke et al. | 709/232 |
| 6,076,114 | A | * | 6/2000 | Wesley | 709/235 |

OTHER PUBLICATIONS

Kazama et al., "Novel Packet Transmission Scheme For Personal Communication Systems," Sep. 27, 1994, IEEE, pp. 516–520.*

* cited by examiner

*Primary Examiner*—Kristine Kincaid
*Assistant Examiner*—Sindya Narayanaswamy
(74) *Attorney, Agent, or Firm*—Steven R. Santema; Valerie M. Davis

(57) ABSTRACT

The device (100) includes a processor (132) coupled to a memory (134) containing a program adapted to control the processor (132) to manage communications between data communications systems. The management method includes the steps of receiving a first message sent from a first data communications system (102) comprising a plurality of blocks (202), determining whether the blocks (202) of the first message are transferable or non-transferrable, sending a request repeat message to the first data communications system (102) to request the first data communications system (102) to resend the non-transferable blocks (202) of the first message if the processor (132) determines that any of the blocks (202) of the first message are non-transferable, and sending the transferable blocks (202) in the form of a second message comprising a first plurality of fragments (206) to a second data communications system (106) without waiting for the first data communications system (102) to resend the non-transferable blocks (202).

20 Claims, 3 Drawing Sheets

DEVICE AND METHOD FOR MANAGING COMMUNICATIONS BETWEEN DATA COMMUNICATIONS SYSTEMS

FIELD OF THE INVENTION

The present invention is directed to a device and a method for managing communications between data communications systems, specifically a device and a method for managing communications between a wireless data communications system and a wired or wireline data communications system.

BACKGROUND OF THE INVENTION

A topic of increasing interest in the communications industry is the integration of wireless technologies, e.g., cellular technology, with wired or wireline technologies, e.g., computer networks, such as those connected over the World Wide Web. It is thought that by integrating the two technologies together, a communications system of even greater flexibility may be achieved, such that communications between extremely remote parts of the earth may be possible.

Of course, it is a truism in the computer industry that computers will only provide appropriate outputs if the inputs are carefully managed—garbage in, garbage out. Thus, it is necessary to have a high level of accountability for the data transmitted by wireless systems in order for those systems to be integrated with wired systems. Otherwise, it would not be practically possible to support the desired systems integration.

It is well known in the cellular industry to provide such methods of accountability and quality control for data communicated over a wireless system. For example, it is known to divide the data messages to be communicated between, for example, a fixed base station and a mobile station into a plurality of blocks. Each individual block is assigned a block identifier so that the receipt of each block can be confirmed. Thus, in operation, when a data message is sent from an originating station, for example the base station, to a receiving station, for example the mobile station, the mobile station first determines whether all the blocks of the message have been received. If it is determined by the mobile station that less than all of the blocks have been received, or that some of the blocks have been corrupted by noise, for example, the mobile station will send a request repeat signal to the base station. The request repeat signal makes the base station aware that less than all of the blocks sent were successfully received by the mobile station, and provides the base station with the identifiers for those blocks which were not successfully received. In response, the base station transmits to the mobile station a second message including only those blocks which were not previously successfully received. The procedure is repeated until all the blocks of the message are successfully received by the mobile station.

At this point, the mobile station reassembles all of the blocks of the message, and prepares the message for transmission to, for example, a first computer coupled to the mobile station. For example, the message may be formatted into Internet Protocol (IP) format, i.e., having an Internet Protocol header and one or more atomic Internet Protocol data fragments. The message may then pass from the first computer through a series of routers to a second computer at another location.

The above-described system and method have some clear disadvantages. It is necessary for the receiving station to have a considerable amount of buffer memory dedicated to the storage of the blocks of an incoming message until the incoming message can be reassembled. Further, it is necessary for the receiving station to devote a considerable amount of processor time to the reassembly of the blocks into the incoming message once all of the blocks have been received. The speed of the processor is important in this respect, because the operation of the processor can limit the throughput of the wireless/wired system. In the end, the need for additional memory capability and additional processor speed can only be met by increasing the overall cost of the system to the customer or by forgoing other functionalities.

DETAILED DESCRIPTION OF THE PREFERRED EMBODIMENTS

According to an aspect of the present invention, a device for managing communications between data communications systems includes a processor and a memory coupled to the processor and containing a program adapted to control the processor. The program controls the processor to receive a first message sent from a first data communications system comprising a first plurality of blocks, and to determine whether the blocks of the first message are transferable or non-transferable. The program also controls the processor to send a request repeat message to the first data communications system to request the first data communications system to resend the non-transferable blocks of the first message if the processor determines that any of the blocks of the first message are non-transferable. Further, the program controls the processor to send the transferable blocks in the form of a second message comprising a first plurality of fragments to a second data communications system without waiting for the first data communications system to resend the non-transferable blocks.

Figure 1:
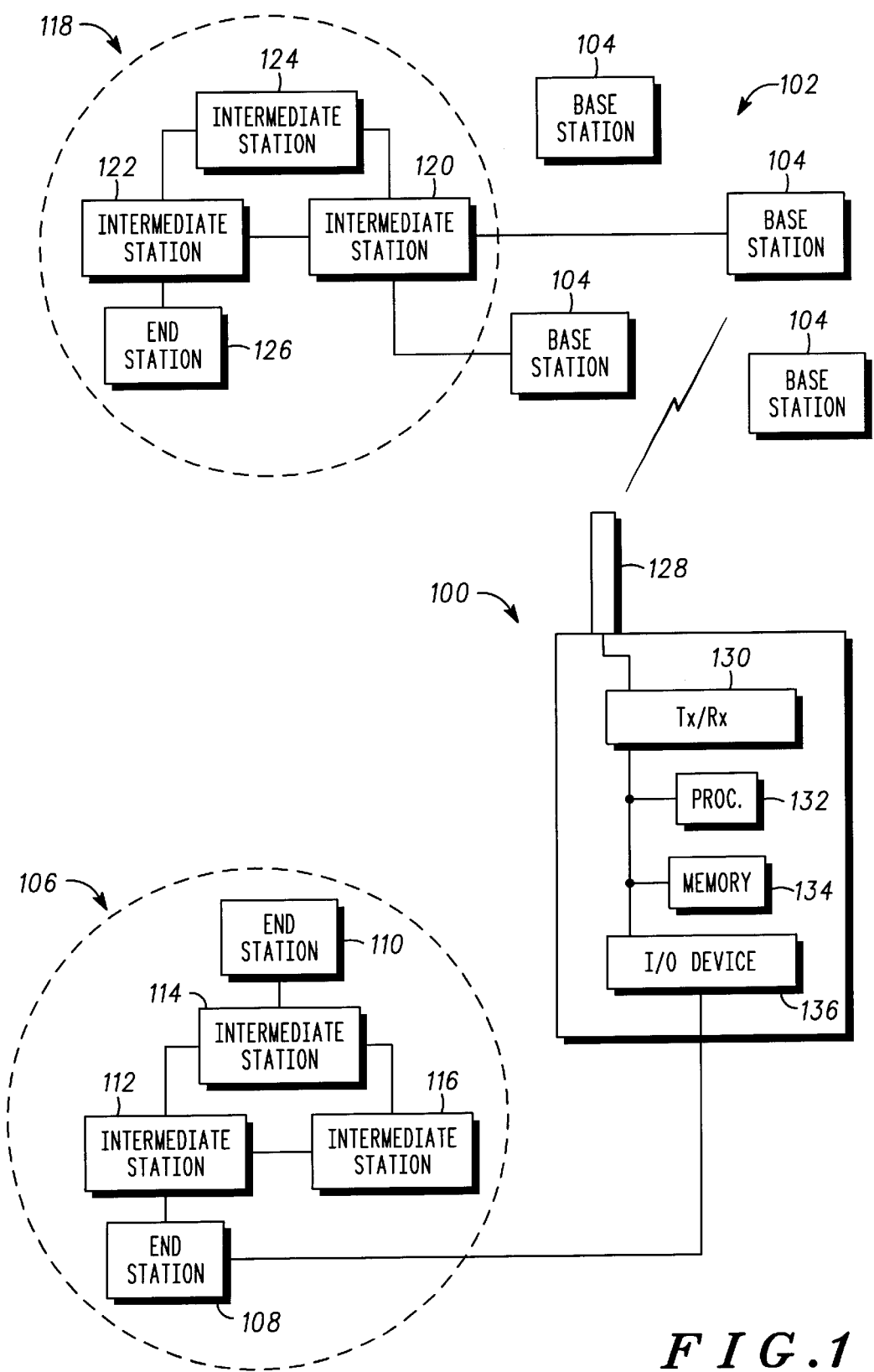
FIG. 1 is a schematic diagram of a device according to an embodiment of the present invention for managing communications between data communications systems in communication with a wireless data communications system and a wired or wireline data communications system.

An embodiment of a device 100 according to the present invention for managing communications between data communications systems is shown in FIG. 1. As shown, the device 100 is configured as a mobile station, and is in communication with a wireless data communications system 102 via one of a plurality of base stations 104. Additionally, the device 100 is in communication with a wired or wireline communications system 106.

It will further be recognized that while the wired communications system 106 is represented by two end stations 108, 110 and three intermediate stations 112, 114, 116, the wired communications system 106 may, and typically does, include large numbers of end stations and intermediate stations. For simplicity, a relatively small number of end stations 108, 110 and intermediate stations 112, 114, 116 have been shown to illustrate the embodiments of the present invention.

Additionally, it will be recognized that the base station 104 coupled to the device 100 is also coupled to a second wired data communications system 118, including intermediate stations 120, 122, 124 and a end station 126. One of ordinary skill in the art will thus understand that in the alternative to or in addition to the embodiment described above, wherein the mobile station 100 is configured as a device according to the present invention, the base stations 104 may also be configured as devices according to the present invention. In such a case, the device/base stations 104 would manage communications between the wireless data communications system including the device/mobile station 100 and the wired data communications system 118.

Further, while not illustrated, it would be recognized from the foregoing that the device and method according to the present invention are useful in connecting any two systems together, regardless of the wired or wireless status of such systems. For example, the device and method according to the present invention may be used to link wired or wireless systems together, as well as wired systems to wireless systems as shown.

The device 100 is now discussed in greater detail. The device 100, which is in communication with the systems 102, 106, includes an antenna 128, a transmitter/receiver 130, a processor 132, a memory 134, and an input/output device 136. The antenna 128 and associated transmitter/receiver 130 are used to communicate with the first communications system 102, in particular one of the base stations 104. Similarly, the input/output device 136 is used to communicate with the second data communications system 106, in particular the end station 108. The memory 134 is used to store a program which controls the processor 132 according to an embodiment of the method of the present invention to manage the communications between the data communications systems 102, 106. The memory 134 is also used to store the blocks and fragments of formatted messages, as explained in greater detail below.

In operation, the device 100 receives a first message sent from the first data communications system 102 via the base station 104. The first message, which includes a plurality of blocks, each block identified by a block identifier, is received by the device 100 via the antenna 128 and the transmitter/receiver 130. The program stored in the memory 134 controls the processor 132 to review the first message to determine whether the blocks of the first message are transferable or non-transferable, e.g., whether any of the blocks has been corrupted by noise and therefore cannot be transferred to the system 106, using suitable methods well-known in the art. If the processor 132, under the control of the program in the memory 134, determines that any of the blocks of the first message are nontransferrable to the system 106, then the processor 132 operates the transmitter/receiver 130 to send a request repeat message via the antenna 128 to the base station 104 to the first data communications system 102 to request the first data communications system 102 to resend the non-transferable blocks of the first message. The request repeat message preferably includes the block identifiers corresponding to the non-transferable blocks of the first message.

Without waiting for the first data communications system 102 to resend the non-transferable blocks, if any, the program controls the processor 132 to format the transferable blocks into a second message which includes a message identifier and a plurality of fragments which correspond to the blocks received. The message identifier is formatted to ensure that the second message is appropriately routed to its destination in the second system 106 (for example, the end station 110), and also to provide a means for identifying other fragments to be associated with the second message.

The associated fragments will be reassembled using suitable methods well-known in the art in the second system 106 at the end station 110, for example, although the reassembly may occur elsewhere in the system 106, for example at the intermediate station 114. The program then controls the processor 132 to send the second message to the second data communications system 106 via the input/output device 136. Upon receipt, the system 106 forwards the second message through the end station 108 and the intermediate stations 112, 114 to the end station 110.

In the meantime, the device 100 receives a third message including the non-transferable blocks of the first message as an incident of the request repeat message sent by the device 100. The program controls the processor 132 to determine whether the blocks of the third message are transferable or non-transferable. If the processor 132 determines that any of the blocks of the third message are non-transferable, then the processor 132 sends another request repeat message to the first data communications system 102 to resend the non-transferrable blocks of the third message.

Without waiting for the first communications system to resend the non-transferable blocks of the third message, provided that at least some of the blocks of the third message are transferable, the program controls the processor 132 to format the blocks of the third message into a fourth message which has the same message identifier as the second message and includes fragments corresponding to the transferable blocks received in the third message. The fourth message is then sent to the second data communications system 106.

The second data communications system 106 then forwards the fourth message from the end station 108 to the end station 110 via the intermediate stations 112, 114. If the fragments in the second and fourth messages correspond to all of the blocks intended to have been sent in the first message, the end station 110 assembles the fragments. If less than all of the information is present, then the above-mentioned steps are repeated.

By utilizing such a device and such a method, a great savings in equipment costs may be achieved. For example, it is not necessary to provide a sizable buffer memory for the device 100, as it is not necessary to store the entire message for reassembly at the device 100. Furthermore, it is not necessary to increase the speed or power of the processor 132 in order to perform the reassembly step, the reassembly functionality now occurring at the end station 110 of the second data communications system 106.

Figure 2:
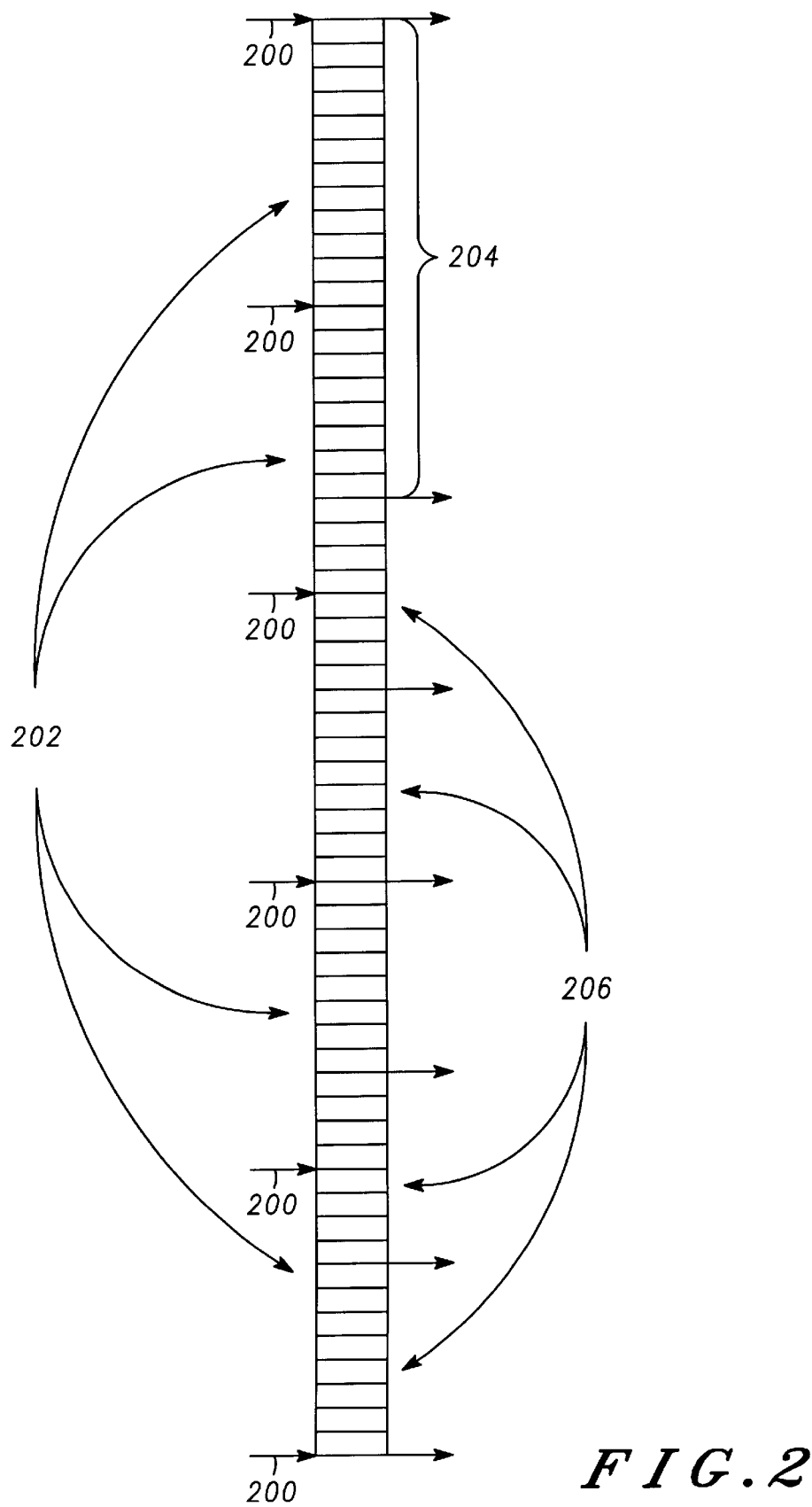
FIG. 2 is a schematic diagram of a message as it is represented in the wireless and wired data communications systems of FIG. 1.
Figure 3:
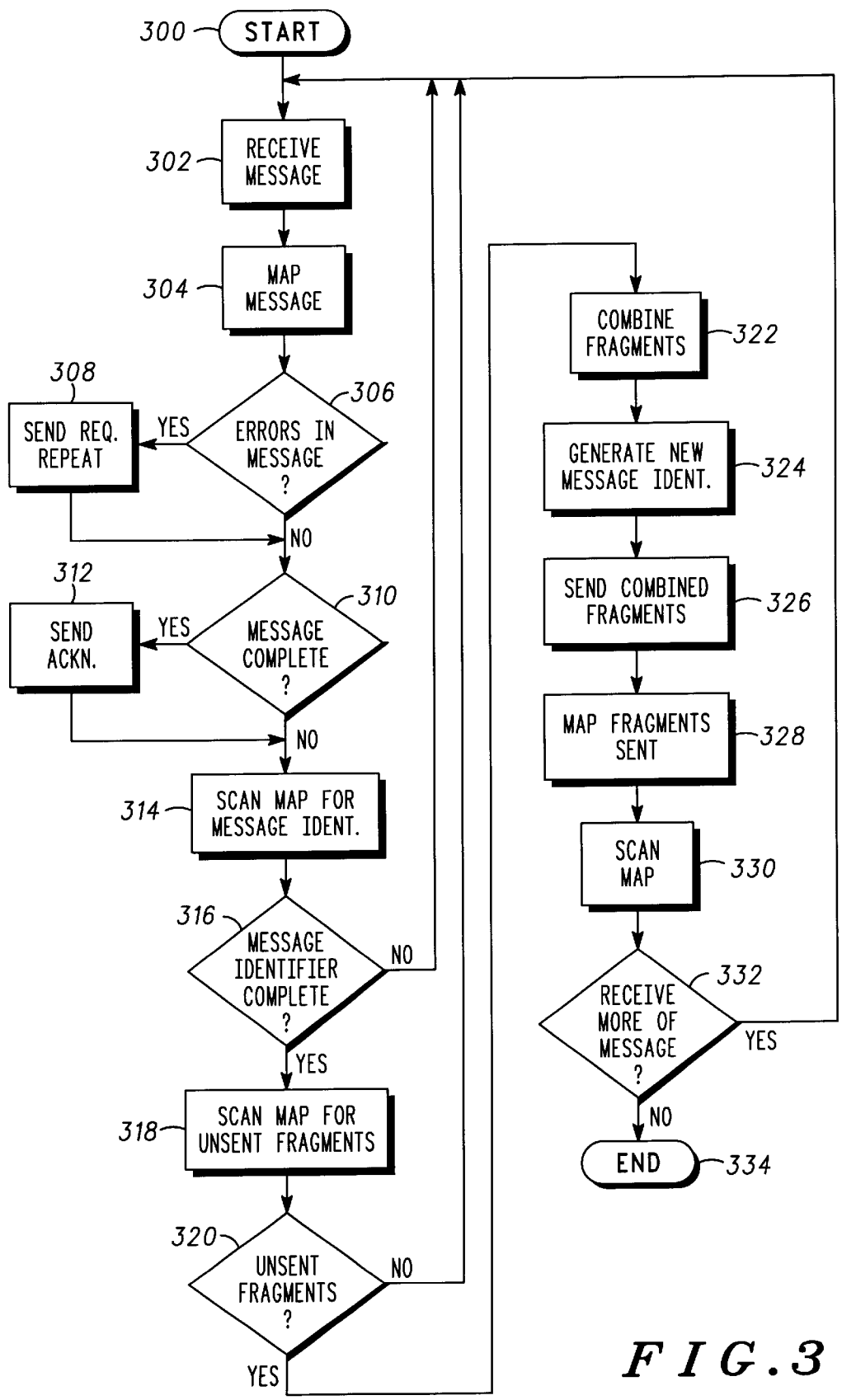
FIG. 3 is a flow chart illustrating an embodiment of a method according to the present invention for managing communications between data communications systems.

The operation of the program stored in the memory 134 of the device 100 is now discussed in greater detail relative to FIGS. 2 and 3. As shown in FIG. 3, the program starts at a step 300, the device 100 being contacted by one of the first and second data communications systems 102, 106, in this case the first data communications system 102. At a step 302, the program controls the processor 132 to receive the message, which consists of a plurality of blocks, each block containing between 102 and 106 bytes and a block identifier. In FIG. 2, arrows 200 are marked along the left hand side to show the division of the message into individual blocks 202.

The program then controls the processor 132 at a step 304 to map the blocks 202 of the first message into the format used with the other of the first and second data communications systems 102, 106, in this case the second data communications system 106. Specifically, messages communicated in the second data communications system 106 include a message identifier and a plurality of message fragments. Thus, the blocks 202 are mapped into a message identifier 204 and a plurality of message fragments 206, as shown in FIG. 2.

As can be further seen in FIG. 2, the message identifier 204, for example an Internet Protocol header, does not have as many bytes as the first two blocks 202 of the message in the first data communications system format. Further, the fragments 206, for example atomic Internet Protocol fragments, are only 8 bytes long. Thus, there may not be a direct correlation between the information contained in the blocks 202 of the first message and the header 204 and the fragments 206 of the second message, although the invention would also encompass a situation where there was direct correspondence between the blocks and fragments.

At a step 306, the program controls the processor 132 to determine whether any of the blocks 202 are non-transferable. That is to say, the program controls the processor 132 to determine whether any of the blocks 202 have been corrupted or are missing, and therefore cannot be transferred as a second message having one or more message fragments 206 to the second data communications system 106. If the processor 132 determines that one or more blocks 202 are non-transferable, the program proceeds to a step 308 wherein the program controls the processor 132 to send a request repeat message to the first data communications system 102. The first request repeat message preferably includes the block identifiers for those blocks 202 which are non-transferable. The program then proceeds to a step 310. Similarly, if all of the blocks are transferable, the program proceeds to the step 310.

At the step 310, the program controls the processor 132 to determine if additional blocks will be sent from the first data communications system 102 to the device 100. If the processor 132 determines at the step 310 that all the blocks 202 of the message have been successfully received, the processor 132 controls the transmitter/receiver 130 at a step 312 to send an acknowledgment signal to the first data communications system 102. The program then proceeds to a step 314. Similarly, the program will proceed to the step 314 if it is determined at the step 310 that the message is not complete.

The program then controls the processor 132 at the step 314 to retrieve the map created at the step 304, and specifically the portion of the map created at the step 304 which corresponds to the message identifier 204 in the format used with the second data communications system 106. The program then proceeds to a step 316, wherein the program controls the processor 132 to determine if the blocks 202 mapped into the message identifier 204 are transferable. If it is determined that the blocks 202 corresponding to the message identifier 204 are not transferable, i.e., that it is impossible to assemble the complete message identifier 204 from the information received, then the program returns to the step 2, and proceeds through the steps 302, 304, 306, 308, 310, 312, and 314 until a sufficient amount of information has been received so that the message identifier 204 may be assembled. At that point, the program proceeds to a step 318.

At the step 318, the program controls the processor 132 to scan the map of fragments 206 to determine if one or more of the fragments 206 have not been forwarded on to the second data communications system 106. Of the first time through the program, all of the received fragments have yet to be sent, and as such, all of the received fragments would be flagged as having not yet been sent to the second data communications system 106. On subsequent passes through the program, the scan of the map should determine that fewer and fewer of the fragments have yet to be sent to the second data communications system 106.

The program then proceeds to a step 320, wherein the program controls the processor to determine if there are unsent fragments 206. If it is determined that there are no unsent fragments remaining, then the program returns to the step 302. If it is determined that there are unsent fragments 206 remaining, then the program proceeds to the step 322.

At the step 322, the program then controls the processor 132 to prepare the contiguous complete fragments 206 for transmission to the second data communications system 106 as a second message. At a step 324, the processor adjusts the message identifier so that the fragments 206 forwarded as the second message and subsequent messages may be identified, collected and reassembled in the data communications system 106 according to the Protocol being implemented. The processor 132 then sends the adjusted message identifier 204 and the available fragments 206 in the form of the second message to the second data communications 106. The processor 132 also maps the fragments 206 sent to the second data communications system 106 at a step 328.

The program then controls the processor 132 to scan the map at a step 330 for missing blocks 202 to be received. At a step 332, the processor 132 determines whether the scan has revealed any missing blocks 202. If blocks 202 are still missing, program returns to the step 302. If all of the blocks 202 have been received, the program proceeds to a step 334, and the session is over.

As stated above, once the messages are sent by the device 100 to the second data communications system 106, the message identifier 204 is used to route the messages along the second data communications system 106 for eventual reassembly within the second data communications system 106. Once all of the message fragments 206 sharing a common message identifier 204 have been gathered together, the second data communications system 106 reassembles the message fragments into a single data structure.

The device and method according to the present invention provides several advantages over the prior art. First, by removing the reassembly functionality from the device 100, and delegating that functionality to the second data communications system 106, the considerable amount of buffer memory required to store the message from the first data communications system 102 at the device 100 is no longer necessary. Additionally, it is no longer necessary to allocate processor resources to perform the reassembly step. Furthermore, by transmitting parts of the message along to the second data communications system 106 as they are received, the earliest received fragments can be traveling through the second data communications system 106 while at the same time other fragments are being received from the first data communications system 102. Thus, better use is made of the resources available in the data communications system 106 to provide faster delivery of the data than is realized in the prior art.

Other aspects, objects, and advantages of the present invention will be obtained from a study of the specification, drawings and appended claims.

We claim:

1. A device comprising:
 a processor,
 a memory coupled to the processor and containing a program adapted to control the processor to i) receive a first message comprising a first plurality of blocks sent from a first data communications system; ii) determine whether the blocks of the first message are transferable or non-transferable to a second data communications system; iii) send a request repeat message to the first data communications system to request the first data communications system to resend the non-transferable blocks of the first message if the processor determines that any of the blocks of the first message are non-transferable to the second data communications system; and iv) send the transferable blocks of the first message in the form of a second message comprising a first plurality of fragments to the second data communications system without waiting for the first data communications system to resend the non-transferable blocks of the first message, if any.

2. The device according to claim 1, wherein the program is adapted to further control the processor to i) receive a third message comprising a second plurality of blocks corresponding to the non-transferable blocks of the first message from the first data communications system as an incident of sending the request repeat message signal; and ii) send the second plurality of blocks in the form of a fourth message comprising a second plurality of fragments to the second data communications system.

3. The device according to claim 1, wherein the program is adapted to further control the processor to i) receive a third message comprising a second plurality of blocks corresponding to the non-transferable blocks of the first message from the first data communications system as an incident of sending the request repeat message signal; ii) determine whether the blocks of the third message are transferrable or non-transferable to the second data communications system; iii) send a request repeat message to the first data communications system to request the first data communications system to resend the non-transferable blocks of the third message if the processor determines that any of the blocks of the third message are non-transferable to the second data communications system; and iv) send the transferable blocks of the third message in the form of a fourth message comprising a second plurality of fragments corresponding to the transferable blocks of the third message to the second data communications system without waiting for the first data communications system to resend the non-transferable blocks of the third message, if any.

4. The device according to claim 1, wherein the first message further comprises a block identifier associated with each block, and the program is adapted to control the processor to send a request repeat message comprising the block identifiers corresponding to the non-transferable blocks of the first message to the fist data communications system.

5. The device according to claim 1, wherein the program is adapted to control the processor to send the transferable blocks of the first message in the form of a second message comprising a message identifier and a first plurality of fragments to a second data communications system without waiting for the first data communications system to resend the non-transferable blocks of the first message, if any.

6. The device according to claim 5, wherein the message identifier is an Internet Protocol header and the fragments are atomic Internet Protocol fragments.

7. The device according to claim 5, wherein the program is adapted to further control the processor to i) receive a third message comprising a second plurality of blocks corresponding to the non-transferable blocks of the first message from the first data communications system as an incident of sending the request repeat message signal; and ii) send the second plurality of blocks in the form of a fourth message comprising the same message identifier as the second message and a second plurality of fragments to the second data communications system.

8. The device according to claim 5, wherein the program is adapted to further control the processor to i) map the blocks of the first message into the message identifier and the fragments of the second message, ii) determine if the blocks of the first message corresponding to the message identifier of the second message are transferable to the second data communications system, and iii) only if the blocks of the first message corresponding to the message identifier of the second message are transferable to the second data communications system, send the transferable blocks of the first message in the form of a second message comprising a message identifier and a first plurality of fragments to the second data communications system without waiting for the first data communications system to resend the non-transferable blocks of the first message, if any.

9. The device according to claim 8, wherein the program is adapted to further control the processor to map the fragments of the second message sent to the second data communications system.

10. The device according to claim 1, further comprising:
a radio frequency antenna; and
a radio frequency transmitter/receiver coupled to the antenna and the processor to send messages between the device and the first data communications system.

11. A method of managing communications between data communications systems, the method comprising:
receiving a first message comprising a first plurality of blocks sent from a first data communications system;
determining whether the blocks of the first message are transferable or non-transferable to a second data communications system;
sending a request repeat message to the first data communications system to request the first communications system to resend the non-transferable blocks of the first message if the processor determines that any of the blocks of the first message are non-transferable to the second data communications system; and
sending the transferable blocks in the form of a second message comprising a first plurality of fragments to the second data communications system without waiting for the first communications system to resend the non-transferable blocks of the first message.

12. The method according to claim 11, further comprising the steps of:
receiving a third message comprising a second plurality of blocks corresponding to the non-transferable blocks of the first message from the first data communications system as an incident of sending the request repeat message signal; and
sending the second plurality of blocks in the form of a fourth message comprising a second plurality of fragments to the second data communications system.

13. The method according to claim 12, further comprising the step of determining whether the blocks of the third message are transferable or non-transferable to the second data communications system, the step of sending the second plurality of blocks including the step of sending the transferable blocks of the third message in the form of a fourth message comprising u second plurality of fragments corresponding to the transferable blocks of the third message to the second data communications system without waiting for the first communications system to resend the non-transferable blocks of the first message.

14. The method according to claim 11, wherein:

the step of receiving the first message comprises the step of receiving a first message comprising a first plurality of blocks and a block identifier associated with each block sent from a first data communications system; and the step of sending a request repeat message comprises the step of sending a request repeat message comprising the block identifiers corresponding to the non-transferable blocks of the first message to the first data communications system.

15. The method according to claim 11, wherein the step of sending the transferable blocks in the form of a second message comprises the step of sending the transferable blocks of the first message in the form of a second message comprising a message identifier and a first plurality of fragments to the second data communications system without waiting for the first data communications system to resend the non-transferable blocks of the first message.

16. The method according to claim 15, wherein the step of sending the transferable blocks in the form of a second message comprises the step of sending the transferrable blocks of the first message in the form of a second message comprising an Internet Protocol header and a first plurality of atomic Internet Protocol fragments to the second data communications system without waiting for the first data communications system to resend the non-transferable blocks of the first message.

17. The method according to claim 15, further comprising the steps of:

receiving a third message comprising a second plurality of blocks corresponding to the it non-transferable blocks of the first message from the first data communications system as an incident of sending the request repeat message signal; and sending the second plurality of blocks in the form of a fourth message comprising the same message identifier as the second message and a second plurality of fragments to the second data communications system.

18. The method according to claim 15, further comprising the steps of:

mapping the blocks of the first message into the message identifier and fragments of the second message;

determining if the blocks of the first message corresponding to the message identifier are transferable to the second data communications system; and only if the blocks corresponding to the message identifier are transferable to the second data communications system, sending the transferable blocks of the first message in the form of a second message comprising a message identifier and a first plurality of fragments to the second data communications system without waiting for the first data communications system to resend the non-transferable blocks of the first message.

19. The method according to claim 18, further comprising the step of mapping the fragments of the second message sent to the second data communications system.

20. The method according to claim 11, wherein the step of receiving a first message comprises the step of receiving a first radio frequency message from a first wireless data communications system comprising a first plurality of blocks.

* * * * *

UNITED STATES PATENT AND TRADEMARK OFFICE
CERTIFICATE OF CORRECTION

PATENT NO. : 6,799,218 B1
DATED : September 28, 2004
INVENTOR(S) : McGovern et al.

It is certified that error appears in the above-identified patent and that said Letters Patent is hereby corrected as shown below:

Column 10,
Line 4, delete "it"

Signed and Sealed this

Second Day of August, 2005

JON W. DUDAS
*Director of the United States Patent and Trademark Office*